Patented Oct. 16, 1951

2,571,987

UNITED STATES PATENT OFFICE 2,571,987

CONVERSION OF HEXAALKYLDILEAD TO TETRAALKYLLEAD

Thelma W. McDyer and Rex D. Closson, Detroit, Mich., assignors to Ethyl Corporation, New York, N. Y., a corporation of Delaware No Drawing. Application April 26, 1950, Serial No. 158,347

5 Claims. (Cl. 260—437)

This invention relates to the catalytic conversion of hexaalkyldilead to tetraalkyllead. It particularly relates to the conversion of hexaethyldilead, formed as a by-product in certain processes for making tetraethyllead, to tetraethyllead. It is, however, useful in converting other hexaalkyldileads, such as hexamethyldilead, hexapropyldilead and hexabutyldilead, to the corresponding tetraalkylleads.

Certain processes for making tetraethyllead, particularly those involving reducing metals other than sodium, such as magnesium, tend to form substantial quantities of hexaethyldilead in addition to, or in place of, the more important tetraethyllead product. Hexaethyldilead can be converted, in part, to tetraethyllead by thermal treatment at temperatures above 80° C., but such a thermal treatment does not give a quantitative yield and results in a 10 to 40% loss to gaseous decomposition products which have little value. For example, in processes for making tetraethyllead, the tetraethyllead, by one method, is recovered from the other reaction products by steam distillation at about 100° C. At this temperature the hexaethyldilead present yields only 75 per cent of the theoretical yield of tetraethyllead, 25 per cent of gaseous decomposition products being formed. Thus a substantial amount of potential tetraethyllead is lost. Furthermore the thermal reaction is slow compared to our catalytic reaction requiring hours, whereas our reaction is complete in a few minutes.

We have discovered that hexaalkyldileads can be quantitatively converted to the corresponding tetraalkyllead products and to free lead by treatment at temperatures well below 80° C., even room temperature, when certain silica-type catalysts are employed.

The reaction can be expressed by the following equation

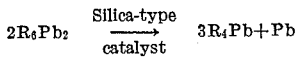

The free lead can be reused in making the alkyllead.

The silica-type catalysts of our invention are silica gel, silica-alumina gel and polyvalent-metal silicates. In general, the latter are heat treated clays, such as fuller's earth, a hydrous magnesium-aluminum silicate, Palm clays which are mined near Otay, California, and the various Filtrol clays developed by the Filtrol Company which are in the main acid treated montmorillonite clays corresponding to

where $n$ is an integer. Also Magnesol, a synthetic hydrous magnesium silicate made by the Westvaco Chlorine Products Corporation, is a good catalyst for our invention.

Our invention can be used directly with various processes for making tetraethyllead by adding one of our catalysts to the reactants whereby the hexaethyldilead is converted in situ, or the hexaethyldilead can be treated separately or in admixture with the tetraethyllead product.

The time for the catalytic conversion of hexaethyldilead is relatively short and substantially instantaneous. A time of less than 15 minutes is all that is usually required. The temperature used varies between 0° and 110° C. At the latter temperature substantial quantities of gas are formed when no catalyst is used, but with one of our catalysts good conversions to the tetraalkyllead product are obtained with little, if any, gas formation. The amount of catalyst employed varies between 0.2 and 5 per cent by weight of the hexaalkyldilead treated when it is treated alone, although amounts considerably greater, up to about 20 per cent of the total material treated, are needed when hexaethyldilead is diluted with reaction products, tetraalkyllead, or other diluents.

Our invention can be further understood by referring to the following working examples:

To 15.7 parts of hexaethyldilead of 98.8 per cent purity were added 0.4 part (2.6 weight per cent) of an acid-treated montmorillonite clay in the form of Super Filtrol. The mixture was agitated for 5 minutes at room temperature, the temperature rising during agitation. At the end of the agitation the typical yellow color of hexaethyldilead had disappeared leaving a colorless liquid which was proven to be tetraethyllead on the basis of density and analysis. In a number of similar tests in which the Filtrol quantity was varied for 0.3 to 1.6 per cent and the temperature from 25° to 80° C. the yield of tetraethyllead varied between 95 and 99 per cent of the theoretical. On the other hand, at 80° C. when no catalyst was employed even after 48 hours only 74 per cent of the theoretical yield of tetraethyllead was obtained. At 25° C. no appreciable conversion of hexaethyldilead occurs in the absence of a catalyst.

In similar examples, the treatment of hexaethyldilead with 2 to 3 per cent of catalyst at 80° C. resulted in substantially quantative conversions to tetraethyllead and free lead by using in separate tests, Mangesol, fuller's earth, silica-alumina gel and silica gel.

The above examples are given as typical of our invention but are not to be considered as limiting the scope.

We claim:

1. A process for converting hexaalkyldilead into tetraalkyllead and free lead comprising treating hexaalkyldilead with at least one silica-type catalyst selected from the group consisting of silica gels, silica-alumina gels and polyvalent-metal silicates.

2. The process of claim 1 in which the material treated is hexaethyldilead.

3. The process of claim 2 in which the catalyst is an acid treated clay.

4. The process of claim 2 in which the time of contact with the catalyst is less than 15 minutes, the temperature during contacting is from 0° to 110° C., and the amount of catalyst is from 0.2 to 20 per cent by weight of the material treated.

5. In a process for making tetraethyllead in which some hexaethyldilead would be formed, the improvement comprising conducting said process in the presence of a catalyst selected from the group consisting of silica gels, silica-alumina gels, and polyvalent-metal silicates.

THELMA W. McDYER.
REX D. CLOSSON.

REFERENCES CITED

The following references are of record in the file of this patent:

UNITED STATES PATENTS

| Number | Name | Date |
| --- | --- | --- |
| 2,407,262 | Linch | Sept. 10, 1946 |

OTHER REFERENCES

Calingaert: Chemical Reviews, vol. 2 (1925–6), page 68.